J. P. ISRAEL.
WEANING-BITS FOR ANIMALS.
No. 186,347.   Patented Jan. 16, 1877.
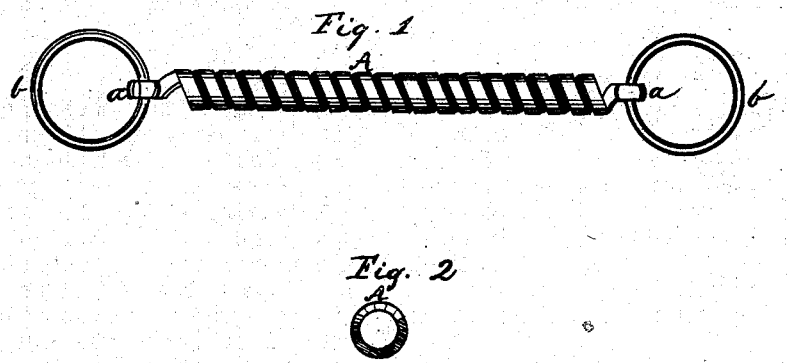

UNITED STATES PATENT OFFICE.

JAMES P. ISRAEL, OF STILESVILLE, MISSOURI.

IMPROVEMENT IN WEANING-BITS FOR ANIMALS.

Specification forming part of Letters Patent No. 186,347, dated January 16, 1877; application filed June 28, 1876.

*To all whom it may concern:*

Be it known that I, JAMES P. ISRAEL, of Stilesville, in the county of Schuyler and State of Missouri, have invented a new and Improved Bit to Prevent Young Animals from Sucking; and I hereby declare the following to be a full, clear, and exact description thereof, reference being had to the accompanying drawing, making part of this specification, in which—

Figure 1 is a plan view of my invention. Fig. 2 is a cross-sectional view.

The object of my invention is to produce a cheap economical bit to prevent young animals from sucking; and it consists in a piece of spirally-coiled flat metal, provided at its ends with suitable devices for fastening, as hereinafter more fully described.

In the said drawings, A is a spirally-coiled strip of flat metal, having the ends *a a* bent over to receive rings *b*, or other suitable holding devices at the ends. This coiled strip A forms a bit, which, on being placed in the young animal's mouth, prevents it from exercising any powers of suction, for the reason that the air will enter at the ends and prevent the creation of a vacuum in its mouth by the muscular action of the lungs, while at the same time the smooth flat character of the coiled metal used will avoid injury to the tender mouth of the young animal.

I am aware that it is not new to make bits of coiled springs constructed of wire, to be used with or without the ordinary bits, and I am also aware that heretofore bits have been made of tubes, having perforations in them, and hence I do not, broadly, claim an open-end bit; but

Having thus described my invention, what I claim as new, and desire to secure by Letters Patent, is—

A bit constructed of a spirally-coiled strip of flat metal, substantially as set forth.

JAMES P. ISRAEL.

Witnesses:
J. B. GAMBLE,
WM. F. MITCHELL.